United States Patent [19]

Shimomura

[11] 4,343,192
[45] Aug. 10, 1982

[54] FLOW RATE MEASURING INSTRUMENT

[75] Inventor: Takao Shimomura, Takaishi, Japan

[73] Assignee: Mitsui Toatsu Chemicals, Inc., Tokyo, Japan

[21] Appl. No.: 124,970

[22] Filed: Feb. 27, 1980

[30] Foreign Application Priority Data

Mar. 2, 1979 [JP] Japan .................................. 54-23382

[51] Int. Cl.³ .............................................. G01F 1/20
[52] U.S. Cl. ................................................. 73/861.21
[58] Field of Search ........... 73/861.18, 861.22, 861.24, 73/861.37, 861.38, 861.21

[56] References Cited

U.S. PATENT DOCUMENTS

| 3,116,639 | 1/1964 | Bird | 73/861.24 |
| 3,608,374 | 9/1971 | Miller | 73/194 B |
| 3,698,245 | 10/1972 | McNabb | 73/861.24 |
| 4,116,060 | 9/1978 | Frederick | 73/861.22 |

FOREIGN PATENT DOCUMENTS 5016169 6/1975 Japan .
1760881 9/1975 Japan .

OTHER PUBLICATIONS

Rusnak, J., "A Linear Momentum Mass Flowmeter", Advances In Instrumentation, vol. 24, Part 1, 1969, pp. 1-5.
Orlando, V. et al., "The Momentum Principle Measures Mass Rate of Flow", Transactions of the ASME, Aug. 1954, pp. 961-965.
Li, Y. et al., "A Fast-Response True-Mass-Rate Flowmeter", Transactions of the ASME, Jul. 1953, pp. 835-841.

Primary Examiner—Herbert Goldstein
Attorney, Agent, or Firm—Fisher, Christen & Sabol

[57] ABSTRACT

A flow rate measuring instrument comprising an oscillation assembly causing self-oscillation responsive to the flow condition of a fluid and a mechanism for adjusting the moment of inertia of the oscillation assembly in response to the variations in the flow condition and other conditions of the fluid, being capable of carrying out required corrections responsive to the changes in the density, level and the like of the fluid for obtaining the true flow rate of the fluid from a detected flow rate on the basis of the detection of the frequency of the oscillation assembly.

7 Claims, 9 Drawing Figures

FLOW RATE MEASURING INSTRUMENT

BACKGROUND OF THE INVENTION

The present invention relates to an instrument for measuring the flow rate of a gaseous or liquid fluid by means of measuring the velocity of the fluid flow, more particularly, to a flow rate measuring instrument, specifically, a self-oscillation type flow rate measuring instrument, provided with a correction device capable of assuring the determination of a true flow rate from a detected flow velocity of the fluid.

Generally, in a flow rate measuring instrument based upon the measurement of flow velocity, it is essentially required that a correction be performed in order to obtain a true flow rate of the fluid from the detected flow velocity. The correction may be performed in response to the change in related parameters such as the density and surface level of a liquid to be measured.

A flow rate measuring instrument utilizing the self-oscillation was proposed and disclosed in the Japanese Patent Application No. 27927/1974 which was laid-open to the public under the Japanese Patent Publication No. 122956/1975. This self-oscillation type flow rate measuring instrument shown in FIG. 1 comprises a delta body, light in weight, made of Aluminium or other light materials and rotatably supported in a fluid flow F. The delta body 1 may be formed into any shape including an opposing face 1a facing against the flow F and a tail portion 1b extending backwardly from the face 1a along the direction of the flow F. FIGS. 1 and 1a show the delta body 1, 1' formed into a triangle and a T-shape in section, respectively. The delta body 1' comprises a plate-like opposing face 1a' and tail portion 1b'.

In FIG. 1, a reference numeral 2 designates a shaft, made of a material such as Aluminium, light in weight, and fixed to a suitable position of the delta body 1 symmetrically in such a manner that it vertically projects therefrom, a reference numeral 9 designating a U-shaped supporting frame extending in the horizontal direction and provided with bearings 3 for pivotably supporting the tip portions of the shaft 2 with reduced friction.

Furthermore, there are provided a balance weight constructed in a criss-cross fashion and fastened to the intermediate portion of one of the shafts 2, a sector 5 to be detected and secured to an appropriate portion of the shaft 2, non-contact sensor 6 for detecting the movement of the sector 5 and outputting pulse signals responsive to the movement, a relay or amplifier 7 connected to the output of the sensor 6, and a counter 8 connected to the output of the relay or amplifier 7.

The self-oscillation type flow rate measuring instrument constructed as mentioned above is arranged in the flow F so that the shaft 2 of the rotary member 1 is positioned along the direction perpendicular to the direction of the flow F. This causes the interaction between the delta body 1 and the fluid, allowing the self-oscillation of the delta body 1 around the shaft 2 to occur. The resultant oscillation of the sector 5 is detected by the sensor 6 and thus, the oscillation frequency of the delta body 1 is counted by the counter 8.

However, in case of employing such a flow rate measuring device utilizing the self-oscillation responsive to the velocity of the flow, the variations in the density and surface level of the fluid to be measured cause an error in determining the true flow rate.

Conventionally, several methods for eliminating the above-mentioned drawback have been proposed. One of the most generalized methods is based upon the utilization of a calculator which receives the flow velocity, the density and level of the fluid or the like for the calculation of the true flow rate. The method, however, can produce disadvantages of causing the necessity of employing a complicated system and being expensive in manufacturing costs.

Although methods for performing a direct correction have also been developed, these methods have seldom been utilized in practice. It can be noted that there cannot be found any simple devices capable of measuring the flow rate of a gaseous fluid in the case of large variations in pressure appearing.

Furthermore, mass flowmeters which have been proposed heretofore are also complicated in construction.

Consequently, improvement of conventional devices has been desired in the field to which the present invention pertains.

BRIEF SUMMARY OF THE INVENTION

An object of the present invention is to provide a simple mechanism for easily performing required corrections responsive to the changes in the density, level and the like of a fluid to obtain the true flow rate of the fluid by adjusting the moment of inertia of an oscillation assembly without interrupting the movement of the oscillation assembly.

In accordance with the present invention, there is provided a flow rate measuring instrument comprising an oscillation assembly causing self-oscillation responsive to the flow condition of a fluid and a mechanism for adjusting the moment of inertia of the oscillation assembly in response to the variations in the flow condition and other conditions of the fluid. Preferably, the mechanism is mounted on a main shaft which supports the oscillation assembly and is pivotably mounted at both ends thereof on bearings, and the mechanism includes a governor and a control lever, the governor having whirling weights and connecting rods for supporting the whirling weights, one end of the rods being fixedly connected to the main shaft and the other end thereof being slidably mounted on the main shaft, the control lever being connected to the slidable end of the rods.

According to the present invention, required corrections responsive to the changes in the density, level and the like of the fluid can be easily carried out in obtaining the true flow rate of the fluid from a detected flow rate on the basis of the detection of the frequency of the oscillation assembly.

BRIEF DESCRIPTION OF THE DRAWING

FIG. 1a is a perspective view of a modification of a delta body shown in FIG. 1;

FIG. 1b is a plan view of the delta body shown in FIG. 1;

DETAILED DESCRIPTION OF THE INVENTION

Figure 2:
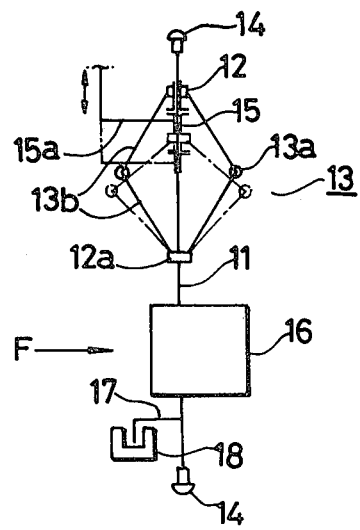
FIG. 2 is a schematic front view of an embodiment according to the present invention.

With reference to FIG. 2, a preferred embodiment according to the present invention will be explained.

Figure 1:
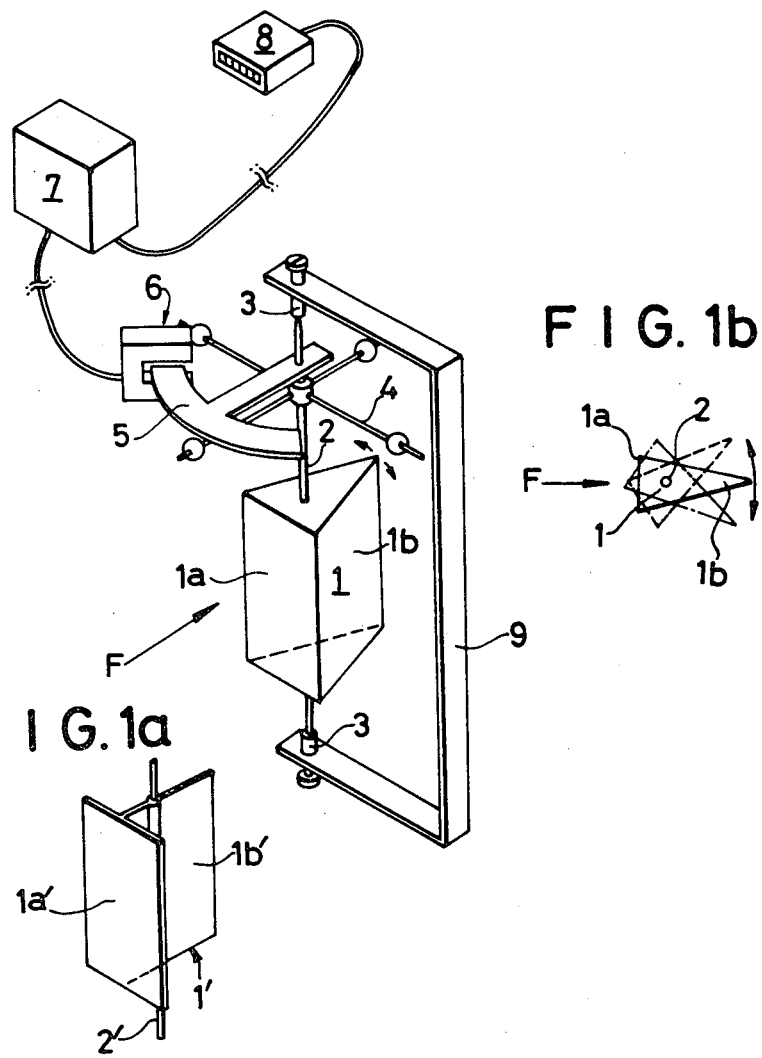
FIG. 1 is a perspective view of one of conventional self-oscillation type flow rate measuring instruments to which the present invention is applied.

In FIG. 2, an oscillation delta body 16, a main shaft 11, a pair of bearings 14, a sector 17 and a photosensor 18 correspond to the delta body 1, the shaft 2, the bearings 3, the sector 5 to be detected, and the sensor which are shown in FIG. 1, respectively. A stationary sleeve 12a is fixedly mounted on a portion of the upper main shaft 11 near the oscillation delta body 16, while a movable sleeve 12 is slidable in the vertical direction and located at a portion of the upper main shaft 11 near the bearings 14. A governor 13 comprises whirling weights 13a and connecting rods 13b which are connected with each other so as to form a pantograph and pivotably fastened at the ends thereof to the stationary sleeve 12a and the movable sleeve 12.

A control sleeve 15 is rotatably and vertically slidably mounted beneath the movable sleeve 12 on the main shaft 11. The vertical position of the control lever 15 is adjusted by means of a control lever 15a connected to the control sleeve 15 so as to control the vertical position of the movable sleeve 12 which is rotatably mounted and located above the control sleeve 15 and capable of sliding in the vertical direction with substantially reduced friction. The friction appearing between the control sleeve 15 and the main shaft 11 is minimized so as to facilitate the oscillating movement of the oscillation delta body 16. The stationary sleeve 12a, the movable sleeve 12, the whirling weights 13a, the control sleeve 15 and the control lever 15a form a mechanism for changing or adjusting the moment of inertia.

According to the present invention constructed as mentioned hereinabove, the distance between the whirling weights 13a is adjusted responsive to the vertical position of the movable sleeve 12 resulting from the vertical movement of the control sleeve 15 which is operated by the control lever 15a. As a result, the moment of inertia of the oscillation assembly can be freely adjusted as a parameter independent from the flow velocity. This permits the simplification of the calculation for the correction of the flow rate.

Figure 3:
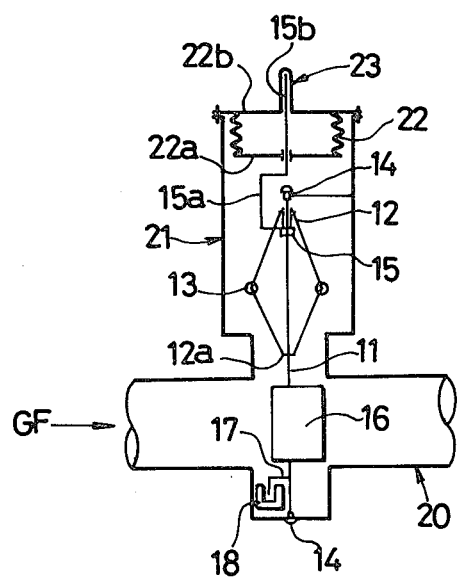
FIG. 3 is a schematic front view of another embodiment according to the present invention.

FIG. 3 schematically illustrates another embodiment according to the present invention which may be applied to a mass flowmeter for a gaseous fluid, wherein a reference numeral 22 designates a bellows filled with a gas which is the same as the gas GF to be measured, the control lever 15 being secured to the central portion of a movable wall 22a of the bellows 22. A transparent index member 23 is formed at the central portion of the stationary wall 22b of the bellows 22 to facilitate the reading of the amount of the movement of an inner end 15b which passes through and is fixed to the movable wall 22a of the control lever 15a. The device for adjusting the moment of inertia consisting of the bellows 22 and the whirling weights 13a and other parts is housed in a casing 21 so that it communicates with a pipe 20 for feeding the gas flow GF.

According to the present invention constructed as explained hereinabove, the gas contained in the bellows 22 represents the density of the gas flow GF. The amount of the extension and contraction of the length of the bellows 22 is inversely proportional to the density of the gas flow GF. The control sleeve 15 and the movable sleeve 12 move in response to the extension and contraction of the bellows 22. This allows the moment of inertia of the oscillation assembly to be inversely proportional to the density of the gas flow GF and the correction of the flow rate possible.

Figure 4:
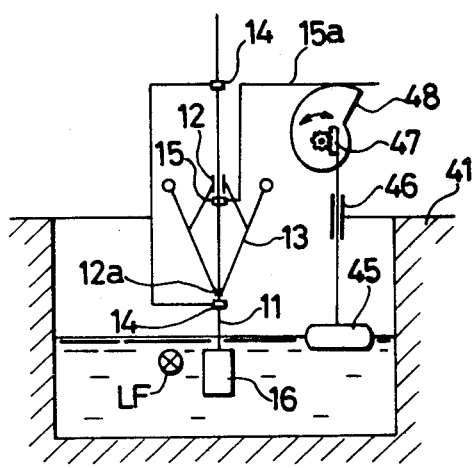
FIG. 4 is a schematic front section view illustrating a further embodiment according to the present invention.

FIG. 4 indicates a further embodiment according to the present invention which is suitably applied to a flowmeter for measuring the flow rate of a fluid to be drained. In FIG. 4, a reference numeral 45 designates a vertically movable float which rests on a liquid flow LF, a reference numeral 46 designating a guide secured to a wall 41 of an open channel through which the liquid flow LF passes and projecting from the wall 41, a suspension rod being connected to the float 45 and passing through the guide 46 so as to slide in the vertical direction in relation to the guide 46, a cam 48 being driven in rotation by the vertical movement of the suspension rod or float 45 through a rack and pinion gear 47, the peripheral surface of the cam controlling the vertical movement of the control lever 15a and that of the movable sleeve 12.

According to the present invention constructed as mentioned above, the oscillation delta body 16 is located at a portion in the liquid flow LF, which portion corresponds to or can represent the average velocity of the liquid flow LF. The vertical movement of the float 45 responsive to the change in the surface level of the liquid flow LF causes the cam 48 to rotate in the corresponding direction, i.e., clockwise or counterclockwise depending on a case, through the rack and pinion gear 48.

Consequently, the control lever 15a moves with the movable sleeve 12 in the vertical direction to change the distance between the whirling weights 13a of the governor 13 during the operation of the governor 13, thereby changing the moment of the oscillation assembly in response to the change in the level of the liquid flow LF.

A further explanation with respect to the present invention will be given hereinbelow.

The embodiment shown in FIG. 1 satisfies the following relationship.

$$f = Kv\sqrt{D/I} \quad (1)$$

,wherein
 f = the oscillation frequency of the rotary member 1
 v = the velocity of the flow
 I = the moment of inertia of the delta body
 D = the density of the fluid
 K = coefficient As noted from the above-mentioned equation, the oscillation frequency f can be changed by changing the moment of inertia of the delta body 1 regardless of the flow velocity v. It is the device for changing the moment of inertia shown in FIG. 2 that realizes the utilization of this principle.

Assuming that A represents the average section area of the bellows 22, H representing the length of the bellows 22, the inner volume V of the bellows 22 and the mass W of the gas enclosed within the bellows 22 are represented by:

$$V = AH$$

$$W = VD = AHD \quad (2)$$

Accordingly, $$D = W/AH \quad (3)$$

As noted from the above-mentioned equations (2) and (3), the density D is proportional to 1/H, i,e., the inverse number of H since W is constant.

Figure 5:
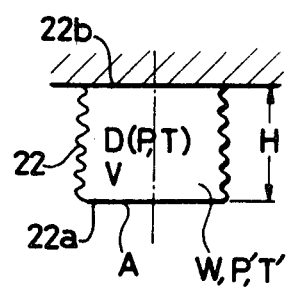
FIGS. 5, 6, and 7 are illustrations relating to the above-mentioned embodiments according to the present invention.

Assuming that the bellows 22 is the part of the gas flow GF defined by a thin separating wall 22a, the density D of the gas inside the bellows 22 becomes the same as the density D' of the gas outside the bellows 22 when the balance between the inner and outer temperature T and T' and between the inner and outer pressures P and P' are established (FIG. 5).

Figure 6:
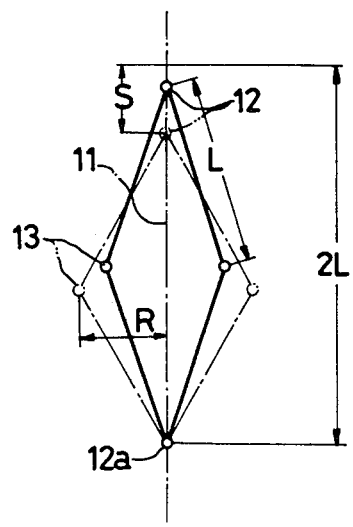

In FIG. 6, the moment of inertia Ic of the governor 13 is proportional to the square of the radius R corresponding to the distance between the whirling weights 13a and the main shaft 11 as shown in the following equation.

$$Ic = M R^2 \quad (4)$$

, wherein M = the mass of the whirling weights 13a

In case the change in the radius R is small, the radius R of the governor 13 is proportional to the square root of the moving distance S of the movable sleeve 12.

$$\text{Thus, } R \approx \sqrt{L S} \quad (5)$$

$$Ic \approx M L S \quad (6)$$

, wherein

L = the length of the connecting rod 13b of the governor 13 or the distance between the whirling weight 13a and the sleeve 12, 12a S = the moving distance of the movable sleeve from the uppermost position thereof Since the moment of inertia Ic of the governor 13 is in proportion to the moving distance S corresponding to the change in the length of the bellows 22, it is possible to cause the moment of inertia I of the oscillation delta body 16a to be substantially inversely proportional to the density D of the fluid. Accordingly, the case shown in FIG. 3 satisfies the following relationship.

$$f = K V \sqrt{D/I} \approx K' V D \quad (7)$$

This reveals the possibility of the provision of a mass flowmeter which oscillates at a frequency proportional to the density of the fluid.

Figure 7:
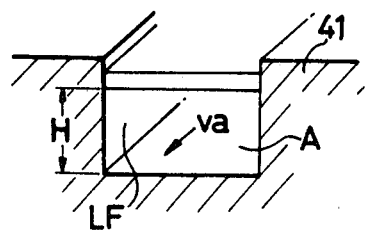

With reference to FIG. 7, the case shown in FIG. 3 will be explained. Assuming that va designates the average velocity of the liquid flow LF, A(x) designating the section area of the liquid flow LF which is a function of the level of the liquid flow LF, the flow rate of the liquid flow is represented by A(x)va. Thus, the variation in the level x causes the change in the section area A(x), producing the necessity of performing a correction.

Here, the cam 48 shown in FIG. 4 is considered as being formed into a shape which fulfills the following relationship.

$$1/\sqrt{I} = C A(x)$$

, wherein C = a coefficient

From the equation (1), the following equation can be obtained.

$$f = K \sqrt{D/I} \cdot va = K' A(x)va, \text{ wherein } K' = K C \sqrt{D}.$$

Accordingly, it is possible to obtain the frequency f proportional to the flow rate A(x) va.

The following table shows the result of a test in which the instrument in FIG. 3 was employed and air was utilized as the gas, the pressure and the flow rate were measured by using a mercury manometer and a dry-type gasmeter, respectively, the surrounding temperature being at constant room temperature.

TABLE

| Pressure (Kg/cm$^2$) | Flow Rate (Nm$^3$/H) | Oscillating Frequency (Hz) |
|---|---|---|
| 0.2 | 12.5 | 2.8 |
| " | 17.7 | 3.6 |
| " | 25.0 | 4.8 |
| " | 33.3 | 6.3 |
| 0.5 | 10.5 | 2.4 |
| " | 15.6 | 3.3 |
| " | 23.7 | 4.5 |
| " | 33.9 | 6.4 |
| " | 42.9 | 8.2 |
| " | 49.3 | 9.6 |
| " | 50.7 | 10.0 |
| 0.7 | 14.0 | 2.8 |
| " | 21.7 | 4.2 |
| " | 32.4 | 6.1 |
| " | 40.9 | 7.8 |
| " | 52.2 | 10.2 |
| " | 60.0 | 12.4 |

The data reveal the fact that the relationship between the frequency and the flow rate does not relate to the pressure.

What is claimed is:

1. A flow rate measuring instrument comprising: an oscillation assembly which self-oscillates in response to the flow condition of a fluid, said oscillation assembly having a component which is of fixed dimensions which interacts with the fluid to generate the self-oscillation; and a mechanism for adjusting the moment of inertia of the oscillation assembly in response to the variations in the flow condition of the fluid, thereby performing a correction of a detected flow rate of the fluid.

2. An instrument as set forth in claim 1, further comprising:

a sensor for detecting the frequency of the oscillation assembly.

3. A flow rate measuring instrument comprising:

an oscillation assembly which self-oscillates in response to the flow condition of a fluid; and a mechanism for adjusting the moment of inertia of the oscillation assembly in response to the variations in the flow condition of the fluid, thereby performing a correction of a detection flow rate of the fluid, said mechanism being mounted on a main shaft which supports the oscillation assembly and which is pivotably mounted at both ends thereof on bearings, the mechanism including a governor and a control lever, the governor having whirling weights and connecting rods for supporting the whirling weights, one end of said rods being fixedly connected to the main shaft and the other end thereof being slidably mounted on the main shaft, the control lever being connected to the slidable end of said rods.

4. An instrument as set forth in claim 3, wherein the oscillation assembly and the mechanism are mounted within a casing communicating with the flow of a gaseous fluid, the mechanism including a bellows the length of which changes so that the amount of change is inversely proportional to the density of the gaseous fluid, the control lever being connected to a movable wall of said bellows.

5. An instrument as set forth in claim 4, further comprising: an index member which facilitates the reading of the amount of movement of one end of said control lever.

6. An instrument as set forth in claim 3, wherein the oscillation assembly is immersed in a liquid and said control lever is operatively connected to a float resting on the surface of the liquid.

7. An instrument as set forth in claim 6, wherein said float rotates a cam through a rack and pinion gear, the peripheral surface of the cam being in contact with said control lever.

* * * * *